US006918382B2

(12) United States Patent
Ramachandran et al.

(10) Patent No.: US 6,918,382 B2
(45) Date of Patent: Jul. 19, 2005

(54) HYDROGEN POWERED SCOOTER

(75) Inventors: Subramanian Ramachandran, Milton, WA (US); Philip Sievers, Detroit, MI (US); Eugene Kurlonko, Lapeer, MI (US); Krishna Sapru, Troy, MI (US); Zhaosheng Tan, Troy, MI (US); Stanford R. Ovshinsky, Bloomfield Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 10/227,764

(22) Filed: Aug. 26, 2002

(65) Prior Publication Data

US 2004/0035401 A1 Feb. 26, 2004

(51) Int. Cl.[7] .................................................. F02B 43/00
(52) U.S. Cl. ................................ 123/527; 123/DIG. 12
(58) Field of Search .......................... 123/DIG. 12, 527

(56) References Cited

U.S. PATENT DOCUMENTS

| | | | | |
|---|---|---|---|---|
| 4,178,882 A | * | 12/1979 | Anderson et al. ............ 123/1 A |
| 4,408,583 A | * | 10/1983 | Merrick ................. 123/406.66 |
| 4,425,140 A | * | 1/1984 | Lassanske et al. .......... 48/189.4 |
| 4,489,564 A | * | 12/1984 | Hausler et al. ............... 62/46.2 |
| 5,152,256 A | * | 10/1992 | Yamauchi et al. ........ 123/41.57 |
| 5,293,857 A | * | 3/1994 | Meyer .................... 123/568.18 |
| 5,572,973 A | * | 11/1996 | Schenk ................... 123/406.18 |
| 6,634,321 B2 | * | 10/2003 | Hussain et al. ................. 123/3 |
| 2002/0006365 A1 | * | 1/2002 | Suzuki et al. ................ 422/177 |
| 2003/0070487 A1 | * | 4/2003 | DaCosta et al. .............. 73/708 |
| 2003/0162059 A1 | * | 8/2003 | Gelsey ........................ 429/17 |

OTHER PUBLICATIONS

A. K. Gayen & O.N. Basrivastaua, Hydrogen Energy Programs in India, Hydrogen Energy Progress X, Jun. 1994, vol. 1, p. 93–99.

* cited by examiner

*Primary Examiner*—Thomas Denion
*Assistant Examiner*—Zelalem Eshete
(74) *Attorney, Agent, or Firm*—Frederick W. Mau, II; Marvin S. Siskind

(57) ABSTRACT

A scooter powered by a hydrogen powered internal combustion engine fueled by a throttled stream of air into which a controlled amount of hydrogen is injected. A hydrogen fuel control system is used to control the amount of hydrogen injected into the throttled air stream using multiple parameters. The amount of hydrogen present in the hydrogen storage unit is monitored using an on-board hydrogen fuel measurement system utilizing a microcontroller and multiple sensors.

40 Claims, 13 Drawing Sheets

Detail B

Detail B

HYDROGEN POWERED SCOOTER

FIELD OF THE INVENTION

The present invention relates generally to a low emission hydrogen powered scooter. More particularly, the present invention relates to a scooter powered by a hydrogen powered internal combustion engine with electronically controlled fuel injector and on-board metal hydride storage with fuel gauge.

BACKGROUND

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations.

For nearly a century and a half, fuels with high amounts of carbon have progressively been replaced by those containing smaller and smaller amounts of carbon. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near future, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities have even tried to stoke fears among ordinary folk that international treaties on climate change would cut economic growth and cost jobs. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles.

Hydrogen is the "ultimate fuel." In fact, it is considered by most to be "THE" fuel for the next millennium, and, it is inexhaustible. Hydrogen is the most plentiful element in the universe (over 95%) and was the first element created by the "Big-Bang." Hydrogen can provide an inexhaustible, clean source of energy for our planet which can be produced by various processes which split water into hydrogen and oxygen. The hydrogen can be stored and transported in solid state form. The instant patent application makes it possible to create a complete generation/storage/transportation/delivery system for such a hydrogen based economy. For example, economical, lightweight, triple-junction amorphous silicon solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency solar panels on nearby farms, in water, or on land. Electricity can be generated to transport and pump the hydrogen into metal hydride storage beds that include the inventive metal hydride alloys disclosed herein. The ultra-high capacities of these alloys allow this hydrogen to be stored in solid form for transport by barge, tanker, train or truck in safe, economical form for ultimate use. Energy is the basic necessity of life and civilization for any society today and the use of hydrogen in the manner described herein as the basic source of energy would end wars fought for control of fossil fuels. Instead of "from well to wheel," the phrase now recited will be "from source to wheel."

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun which is composed mainly of hydrogen and can itself be thought of as a giant hydrogen "furnace". Moreover hydrogen can be produced without the use of fossil fuels, such as by the electrolysis of water using nuclear or solar energy, or any other form of renewable economical energy (e.g. wind, waves, geothermal, etc.). Furthermore, hydrogen, although presently more expensive than petroleum, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations gain economic independence from fossil fuels.

While hydrogen has wide potential application as a fuel, a major drawback in its utilization, especially in mobile uses such as the powering of vehicles, has been the lack of acceptable lightweight compact hydrogen storage medium. Conventionally, hydrogen has been stored in pressure-resistant vessels under a high pressure or stored as a cryogenic liquid, being cooled to an cryogenic temperature. Storage of hydrogen as a compressed gas or liquid involves the use of large and heavy vessels, making the use of hydrogen to power vehicles less feasible.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. These alloys are fully described in U.S. Pat. No. 6,193,929, entitled "High Storage Capacity Alloys Enabling a Hydrogen-based Ecosystem", which is hereby incorporated by reference.

With these developments in the storage of hydrogen, hydrogen now has a viable use as a fuel to power vehicles. Solid-phase metal or alloy system can store large amounts of hydrogen by absorbing hydrogen with a high density and by forming a metal hydride under a specific temperature/pressure or electrochemical conditions, and hydrogen can be readily released by changing these conditions.

With hydrogen now being a viable source to power vehicles, considerable research has been performed on designing engines to run on hydrogen rather than fossil fuels. In these designs, hydrogen is combusted inside an internal combustion engine much like gasoline and other hydrocarbons are combusted in present day internal combustion engines. With hydrogen, however, catalytic converters are not needed to treat the hydrocarbons and carbon monoxide present in the exhaust to comply with emission standards.

The present invention describes a scooter powered by a hydrogen powered internal combustion engine. A specially designed hydrogen storage unit with fuel gauge are used in conjunction with the engine to allow for simple refueling and operation. The disclosed scooter using a hydrogen powered internal combustion engine provides a clean alternative to hydrocarbon powered vehicles, bringing the world one step closer to a "Hydrogen Based Ecosystem".

SUMMARY OF THE INVENTION

The present invention discloses a hydrogen powered scooter including a hydrogen powered internal combustion engine, a fuel induction system, an ignition system, an on-board hydrogen fuel gauge, and a source of gaseous hydrogen. The scooter utilizes a throttled stream of air fed into the hydrogen powered internal combustion engine. The hydrogen is dispersed, directly or via a fuel injector, into the throttled stream of air via a feed tube or a boost venturi positioned within the throttled stream of air. After mixing with the hydrogen, the throttled air stream is compressed and combusted in the engine cylinder to propel the scooter.

The fuel induction system includes a hydrogen fuel control system, at least one hydrogen fuel injector, and a hydrogen fuel pressure regulator. The hydrogen fuel control system is configured to provide a hydrogen fuel control signal to the hydrogen fuel injector based upon engine speed, manifold absolute pressure, and throttle position. The hydrogen fuel control system may be configured to additionally take into account the temperature of the throttled stream of air and the amount of oxygen present in exhaust from the hydrogen powered internal combustion engine when providing a hydrogen fuel control signal to the hydrogen fuel injector. The hydrogen fuel control signal provides the hydrogen fuel injector with a calculated hydrogen fuel injector pulse width.

The ignition system includes a multiple spark discharge ignition controller, a spark plug, a programmable ignition control system, and a spark trigger. The programmable ignition control system causes the spark plug to fire at a specific crank angle at a given speed.

The multiple spark discharge ignition controller is triggered off of the camshaft utilizing a sensor which allows the spark plug to fire on the compression stroke. The programmable ignition also allows changing the ignition timing as a function of the manifold absolute pressure.

The source of gaseous hydrogen may be an on-board hydrogen storage unit. The on-board hydrogen storage unit includes at least one metal hydride storage unit at least partially filled with a hydrogen storage alloy. The metal hydride storage unit may be heated with an exhaust stream from the hydrogen powered internal combustion engine. The metal hydride storage units are each laterally divided into a plurality of compartments with at least one heat conductive segmental plate. At least one gas filtration/distribution tube is inserted into each metal hydride storage unit. Hydrogen enters and exits the metal hydride storage units via the gas filtration/distribution tube. The gas filtration/distribution tube may be wrapped with a stainless steel wire cloth to prevent entrainment of hydrogen storage alloy in the exiting hydrogen stream. A metal wool pad is also positioned at the top and bottom of the metal hydride storage unit. The metal hydride storage units are thermally connected via a plurality of heat conductive fins each having a plurality of L-ledged holes through which the metal hydride storage units are inserted.

An on-board hydrogen fuel gauge may be integrated into the on-board hydrogen storage unit. The on-board hydrogen fuel gauge includes an on-board microcontroller, a visual indicator showing the amount of hydrogen present in the hydrogen storage unit, and a system used to track the amount of hydrogen input into the hydrogen storage unit. The on-board hydrogen fuel gauge also includes an orifice plate fuel measurement system or a fuel injector pulse width flow measurement system.

The orifice plate fuel measurement system includes an orifice plate positioned between the hydrogen fuel pressure regulator and the hydrogen fuel injector and multiple sensors. The multiple sensors measure (A) hydrogen gas pressure before the orifice plate, (B) hydrogen gas pressure drop across the orifice plate, and (C) temperature of the hydrogen gas at the orifice plate. The on-board microcontroller then calculates an instantaneous flow rate of hydrogen gas based on the afore mentioned parameters. The instantaneous volumetric flow of hydrogen gas is then decremented from a known amount of hydrogen contained inside the hydrogen storage unit prior to discharge to calculate a value indicative of the actual amount of hydrogen present in the hydrogen storage unit. The known amount of hydrogen contained inside the hydrogen storage unit is calculated and updated using a value input into the microcontroller representing an amount of hydrogen input into the hydrogen storage unit upon refueling.

During operation of the fuel injector pulse width flow measurement system, the calculated hydrogen fuel injector pulse width is directly input into an A/D input channel of the microcontroller. The microcontroller then calculates a volumetric flow rate of hydrogen consumed over time based on the calculated hydrogen fuel injector pulse width and manifold absolute pressure. The volumetric flow of hydrogen consumed over time is decremented from a known amount of hydrogen contained inside the hydrogen storage unit prior to discharge to calculate a value indicative of the actual amount of hydrogen present in the hydrogen storage unit. The known amount of hydrogen contained inside the hydrogen storage unit is calculated and updated using a value input into the microcontroller representing an amount of hydrogen input into the hydrogen storage unit upon refueling.

DETAILED DESCRIPTION OF THE INVENTION

The present invention discloses a scooter propelled by a hydrogen powered internal combustion engine (ICE). The hydrogen powered ICE utilizes a specially designed fuel induction system and ignition system to minimize $NO_x$ emissions and efficiently power the scooter.

Figure 1:
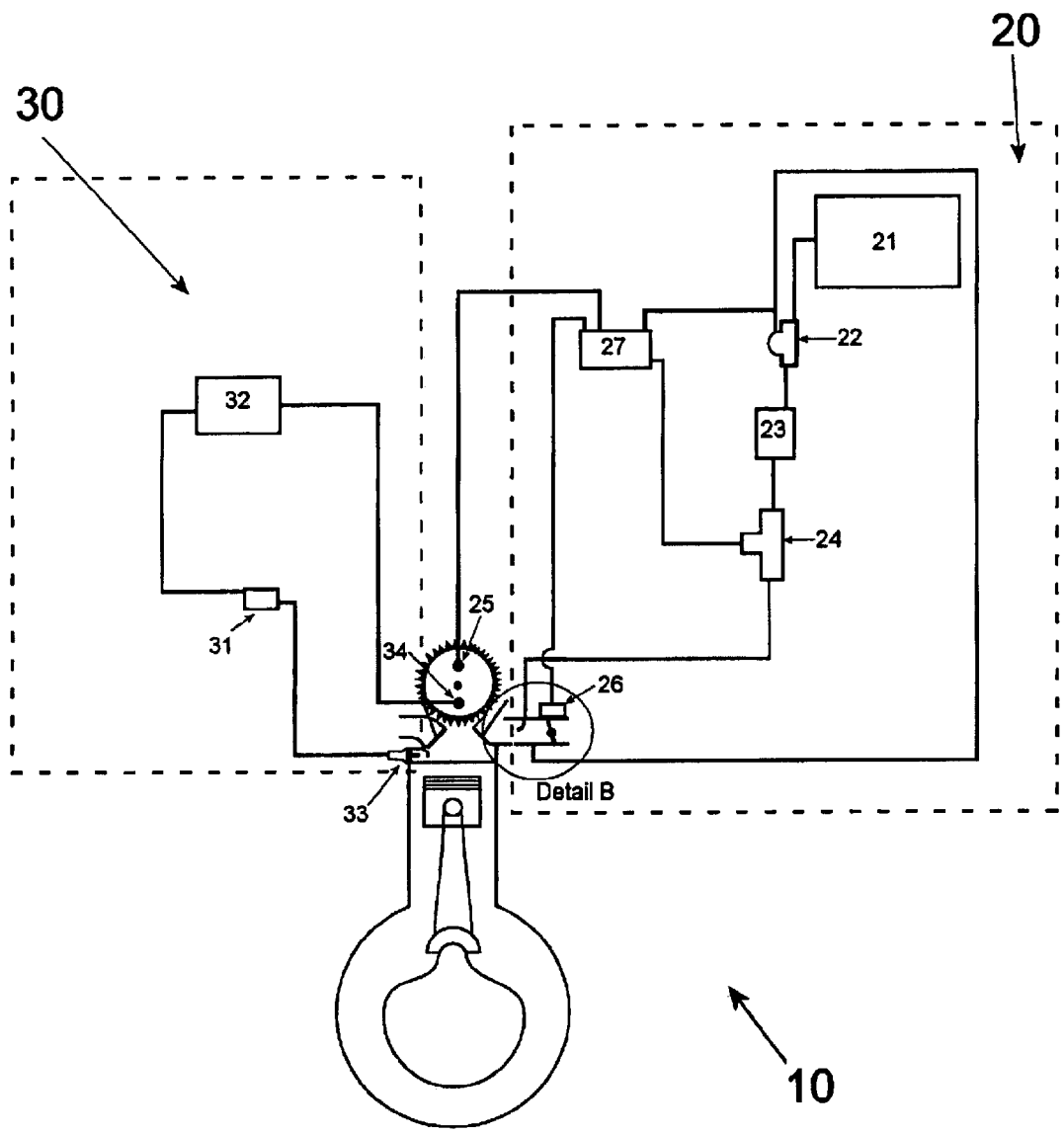
FIG. 1, shows a schematic representation of the present invention.

The concept for the hydrogen powered internal combustion engine system of the present invention is exemplified in FIG. 1. The system includes a hydrogen powered internal combustion engine 10, a fuel induction system 20, and an ignition system 30. The fuel induction system includes a source of gaseous hydrogen 21, a hydrogen fuel pressure regulator 22, a flash back arrestor 23, a hydrogen fuel injector 24, a fuel injector trigger 25, a throttle position sensor 26, and a hydrogen fuel control system 27. The ignition system 30 includes an ignition coil 31, a multiple spark discharge ignition controller 32, a spark plug 33, a spark trigger 34, and an optional manifold absolute pressure sensor input.

The hydrogen powered internal combustion engine 10 may be a single cylinder 4 stroke 80 cc engine, however, the hydrogen powered internal combustion engine in accordance with the present invention may also have multiple cylinders and vary accordingly. The hydrogen powered internal combustion engine may be either air cooled or liquid cooled. During operation of the scooter, a throttled stream of air is fed into the hydrogen powered internal combustion engine. A controlled amount of hydrogen is injected into the air stream before the air stream is supplied to the cylinders. To reduce backfire, the hydrogen is mixed with the air stream as late as possible. After the hydrogen mixes with the air stream, the air/hydrogen mixture enters the cylinder through an intake valve and is compressed and combusted to provide work to a crankshaft.

Figure 2:
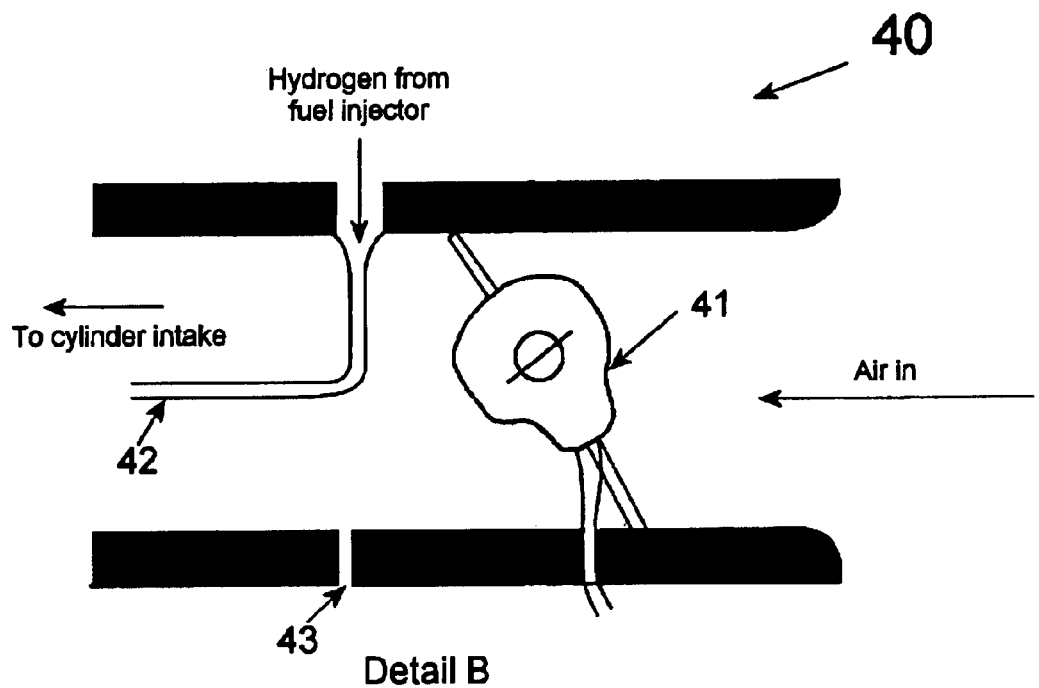
FIG. 2, shows a depiction of the throttle body in accordance with the present invention utilizing a feed tube.
Figure 3:
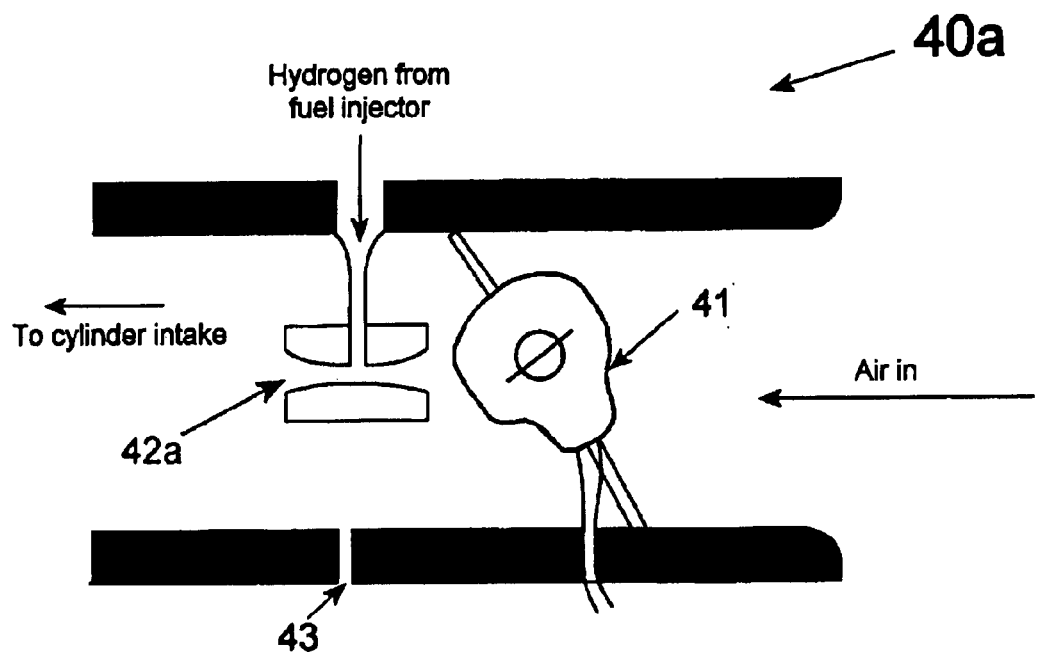
FIG. 3, shows a depiction of the throttle body in accordance with the present invention utilizing a boost venturi.

The throttle body 40 of the present invention is shown in FIG. 2. The throttle 41 allows a stream of air to flow toward the hydrogen powered internal combustion engine 10. The hydrogen fuel injector 24 injects hydrogen into the air stream via a hydrogen dispersing tube 42. The end of the hydrogen dispersing tube through which the hydrogen contacts the air stream is positioned in the middle of the air stream to obtain optimal mixing between the air and the hydrogen. The manifold absolute pressure in the throttle body may be measured by a sensor 43 placed after the throttle 41. In another embodiment, a boost venturi tube 42a may be used to disperse the hydrogen into the air stream. This alternative embodiment is shown in FIG. 3.

The hydrogen powered internal combustion engine is operated lean to minimize $NO_x$ generation. The engine is operating lean where λ (Actual air-fuel ratio/Stoichiometric air-fuel ratio) is greater than 1. Conversely, the engine is running rich where λ is less than 1. The stoichiometric air-fuel ratio is approximately 34 kg air/kg $H_2$ for the combustion of hydrogen. At this ratio there is neither a shortage nor an excess of air needed to completely combust the hydrogen.

The hydrogen powered internal combustion engine described in the present invention will operate with a λ value between 0.13 and 10. Preferably operation will be with a λ value between 1 and 3. Upon startup and during hard acceleration, the hydrogen engine may operate at a λ value of 1 to provide maximum power. After startup, the hydrogen engine may operate at a λ value greater than 2 to minimize $NO_x$ emissions.

The ignition for the hydrogen powered ICE may use a multiple spark discharge controller. This type of ignition allows for a unique set timing. The ignition is triggered off the camshaft rather than the crankshaft to eliminate the waste spark occurring during the exhaust stroke, which may cause backfiring. A programmable ignition control system may be used to modify the stock ignition timing. The spark can be programmed to occur at a specific crank angle at a given speed. A sensor is utilized on the camshaft allowing the ignition to only fire on the compression stroke.

The control system is responsive to signals based on the engine speed, the manifold absolute pressure, and the throttle position. Based on these signals, the control system provides a control signal with a calculated pulse width to the hydrogen fuel injector, thereby controlling the amount of hydrogen supplied to the hydrogen powered internal combustion engine. The control system utilizes multiple sensors to measure these quantities. The control system may also be modified to use additional input such as the throttled air stream temperature and exhaust oxygen for better control over the fuel delivery to the hydrogen powered internal combustion engine.

In addition to the electronic control of the pulse width to meter the hydrogen flow, the flow is also metered pneumatically by biasing the hydrogen fuel pressure regulator with the manifold vacuum. A sensor 43 is used to measure the manifold absolute pressure in the throttle body 40. Using the manifold absolute pressure (MAP) to bias the hydrogen fuel pressure regulator controls the hydrogen pressure at the hydrogen fuel injector. The applied hydrogen pressure must be modulated about the mechanically set point using the manifold vacuum. When the throttle opens wider and the MAP increases, the hydrogen pressure increases at the hydrogen fuel injector. Conversely, when the throttle is closed, the MAP drops and the hydrogen pressure at the hydrogen fuel injector is lowered. The hydrogen will be provided to the hydrogen powered internal combustion engine from a source of gaseous hydrogen 21.

The source of gaseous hydrogen 21 may be a hydrogen storage unit 50 at least partially filled with a hydrogen storage alloy 52. The hydrogen storage alloy preferably has a low plateau pressure to allow low pressure introduction of hydrogen into the hydrogen powered internal combustion engine. This insures that the alloy characteristics are not a limiting factor. The hydrogen pressure inside the hydrogen storage unit may be regulated down to 10–20 psig. The hydrogen storage unit is integrated into the scooter and is designed to derive its heat of endothermic desorption from the engine exhaust, an engine coolant stream, or other sources of heat. In such cases, the exhaust gas or engine coolant stream may pass through tubes in thermal contact with the hydrogen storage alloy or the hydrogen storage unit may be heated by the exhaust gases or engine coolant stream in another manner. The interior of the hydrogen storage unit may also be divided into compartments by thermally conductive materials to better accommodate heat transfer throughout the vessel and prevent densification and subsequent expansion of the hydrogen storage alloy (upon charging with hydrogen) which can cause strain to the wall of the unit. Such hydrogen storage vessels are described in U.S. patent application Ser. No. 10/143,243, entitled "A Honeycomb Hydrogen Storage Structure", filed on May 9, 2002 the disclosure of which is herein incorporated by reference. Hydrogen may also be stored in gaseous or liquid form, however, storing hydrogen in this manner imposes greater safety risks and design constraints due to the extreme conditions needed to store the hydrogen at such conditions.

Figure 4:
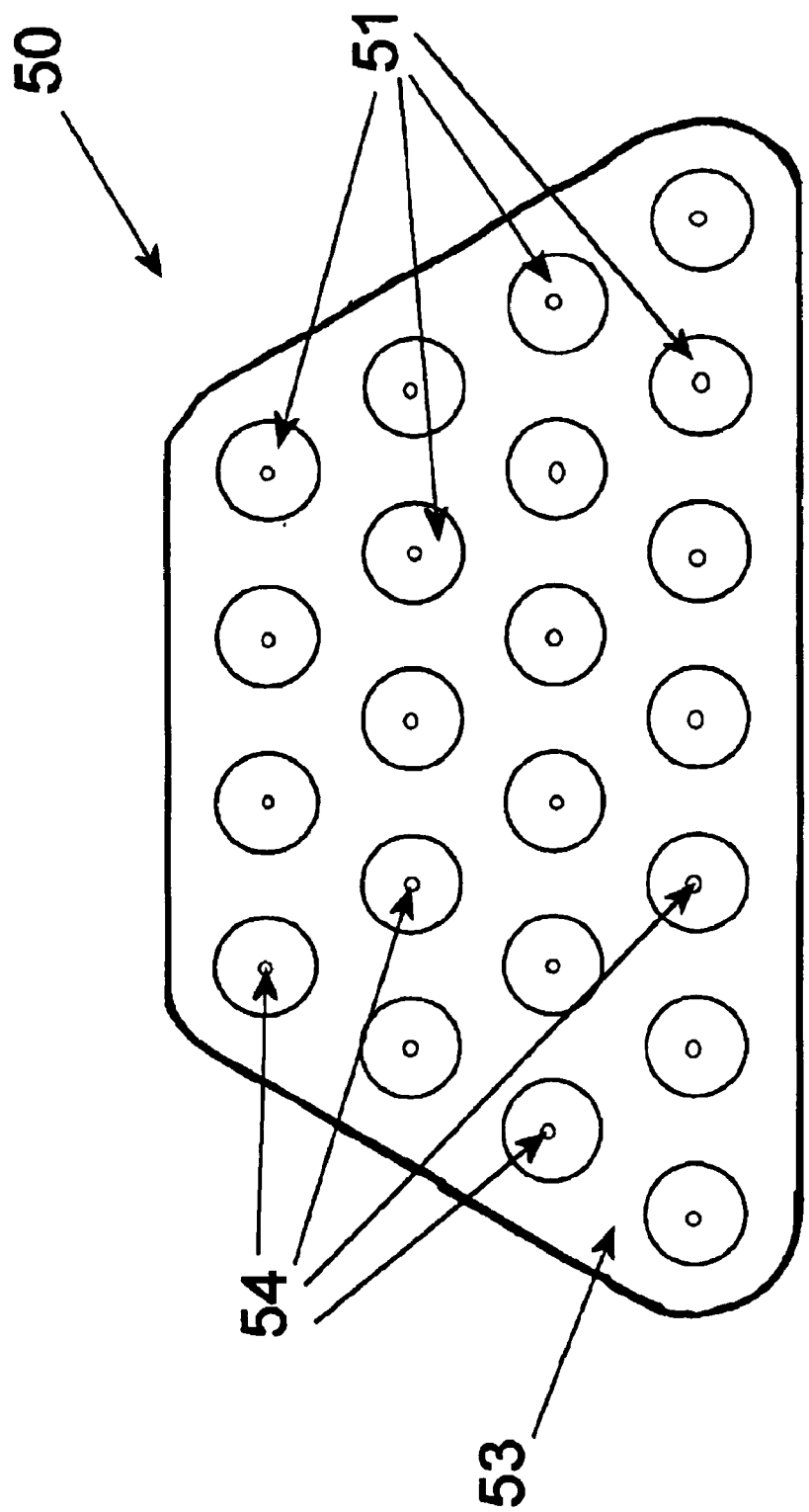
FIG. 4, shows a cross-section of the hydrogen storage unit in accordance with the present invention.
Figure 5:
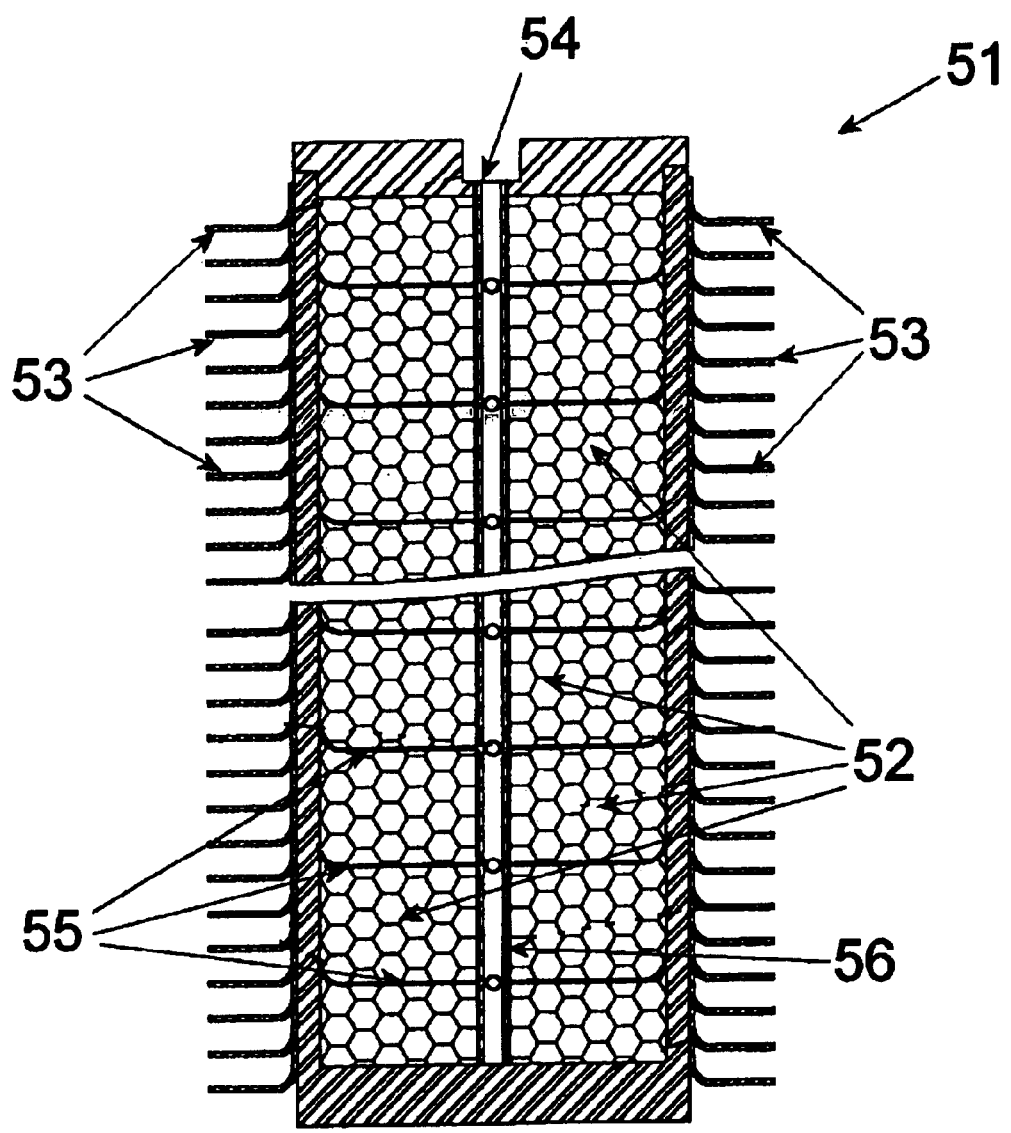
FIG. 5, shows a depiction of the metal hydride storage unit in accordance with the present invention

A cross-sectional view of the hydrogen storage unit 50 in accordance with the present invention is depicted in FIG. 4. The hydrogen storage unit 50 includes one or more segmented metal hydride storage units 51 at least partially filled with a hydrogen storage alloy 52, a plurality of heat conductive fins 53, and at least one gas filtration/distribution tube 54. A cross-sectional view of a metal hydride storage unit in accordance with the present invention is depicted in FIG. 5. Preferably the metal hydride storage units will have a cylindrical structure, however, other designs may be used in accordance with the present invention. Heat conductive segmental plates 55 are used to segment the interior of the metal hydride storage units. The heat conductive segmental plates have a tight contact with the inner wall of the metal hydride storage units, where the heat exchange between the metal hydride and the surroundings takes place.

The metal hydride storage units 51 are inserted through a plurality of heat conductive fins 53. The heat conductive fins have a plurality of L-ledged holes through which the metal hydride storage units 51 are placed. The L-ledged holes are slightly smaller than the diameter of the metal hydride storage units to provide a tight fitting heat transferring area between the metal hydride storage unit 51 and the heat conductive fin 53 upon insertion of the metal hydride storage unit 51 into the heat conductive fin 53. Multiple heat conductive fins will be fitted onto each metal hydride storage unit to form a tightly pressed structure. The heat conductive fins provide for exceptional heat transfer between the metal hydride storage units and the surroundings.

At least one gas filtration/distribution tube 54 is inserted longitudinally through each metal hydride storage unit 51. The gas filtration/distribution tube 54 preferable has a thin wall and small diameter to optimize room for hydrogen storage. The gas filtration/distribution tube 54 allows hydrogen to enter and exit the metal hydride storage unit 51. The gas filtration/distribution tube 54 is wrapped with stainless steel wire cloth 56 to allow only hydrogen to pass, while keeping the hydrogen storage alloy 51 from escaping into the gas filtration/distribution tube 54. The heat conductive segmental plates 55 have one or more holes to accommodate the gas filtration/distribution tubes 54. The gas filtration/distribution tubes 54 may have a filter to further prevent metal hydride fines from escaping the metal hydride storage units. The gas filtration/distribution tubes are interconnected via a manifold. The manifold distributes hydrogen to the metal hydride storage units upon refueling and combines the hydrogen streams from each metal hydride storage unit to provide one hydrogen stream to the hydrogen fuel injector during operation of the vehicle. Alternatively, the metal hydride storage units may be coupled to a header which will also provide a single stream to the hydrogen fuel injector.

Metal wool pads may be placed at the top and bottom of each metal hydride storage unit. The wool pads act as an elastic sponge to absorb the expansion and contraction of the metal hydride. The wool pads aid in reducing the stress placed on the walls of the metal hydride storage units.

The resulting finned metal hydride storage units are closely bundled and encased in an externally framed box to form the hydrogen storage unit. A base support, connection rods, and a top plate are utilized to form a sturdy structure and frame the metal hydride storage unit bundle. The material for the supporting frame is preferable an aluminum alloy being lightweight and having excellent thermal conductivity, however, other lightweight conductive materials may be substituted. Hydrogen gas is distributed to or collected from the individual metal hydride storage units by a manifold including multiple tubes or a header assembly.

An on-board fuel gauge may be coupled to the metal hydride hydrogen storage unit. The on-board fuel gauge includes a hydrogen gas flow metering system, an on-board microcontroller configured to calculate the volume of hydrogen used at an instant using the signal input from the hydrogen gas flow metering system, a visual indicator that prompts the rider as to the amount of hydrogen present in the hydrogen storage unit, and a system used to track the amount of hydrogen present in the hydrogen storage unit whenever the amount of hydrogen within the hydrogen storage unit is refilled or depleted.

Figure 6:
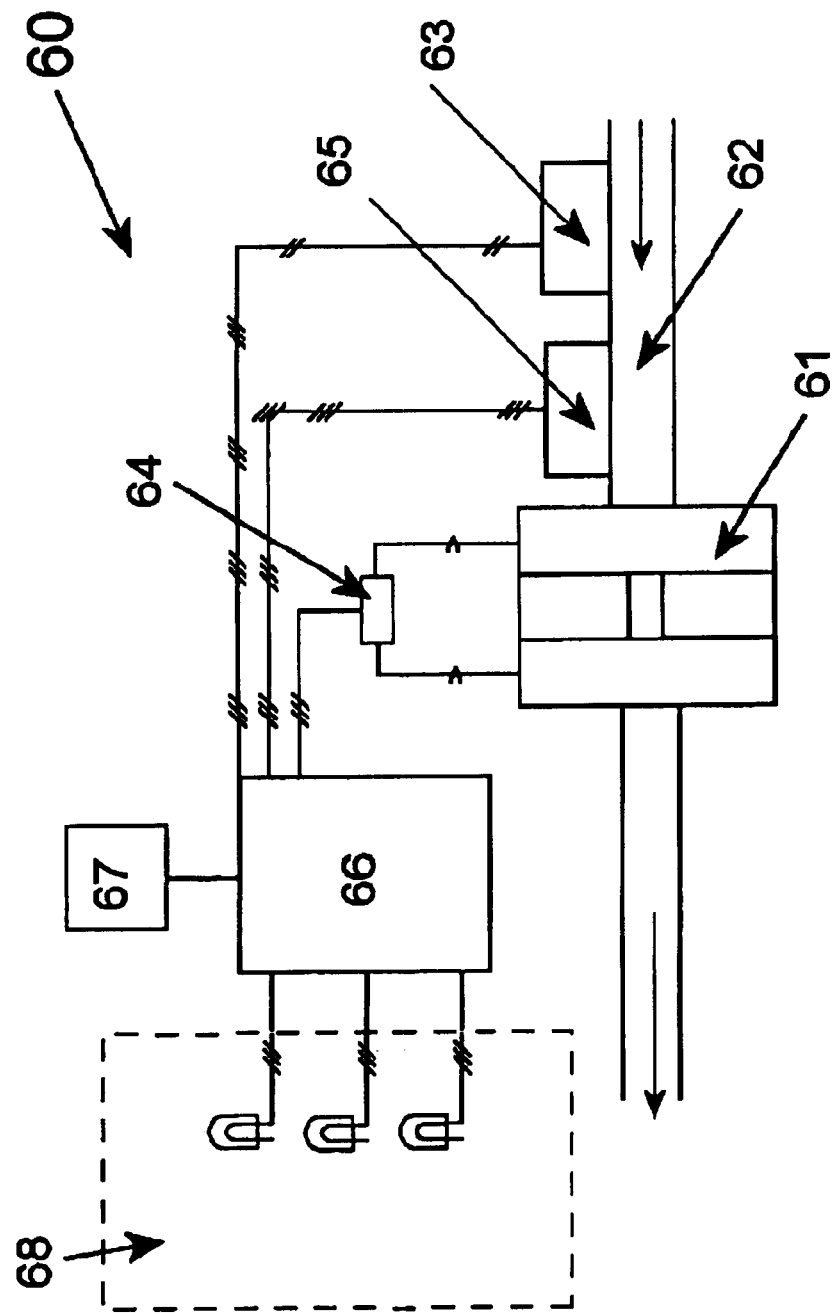
FIG. 6, shows a schematic representation of the orifice plate based on-board fuel gauge in accordance with the present invention.
Figure 7:
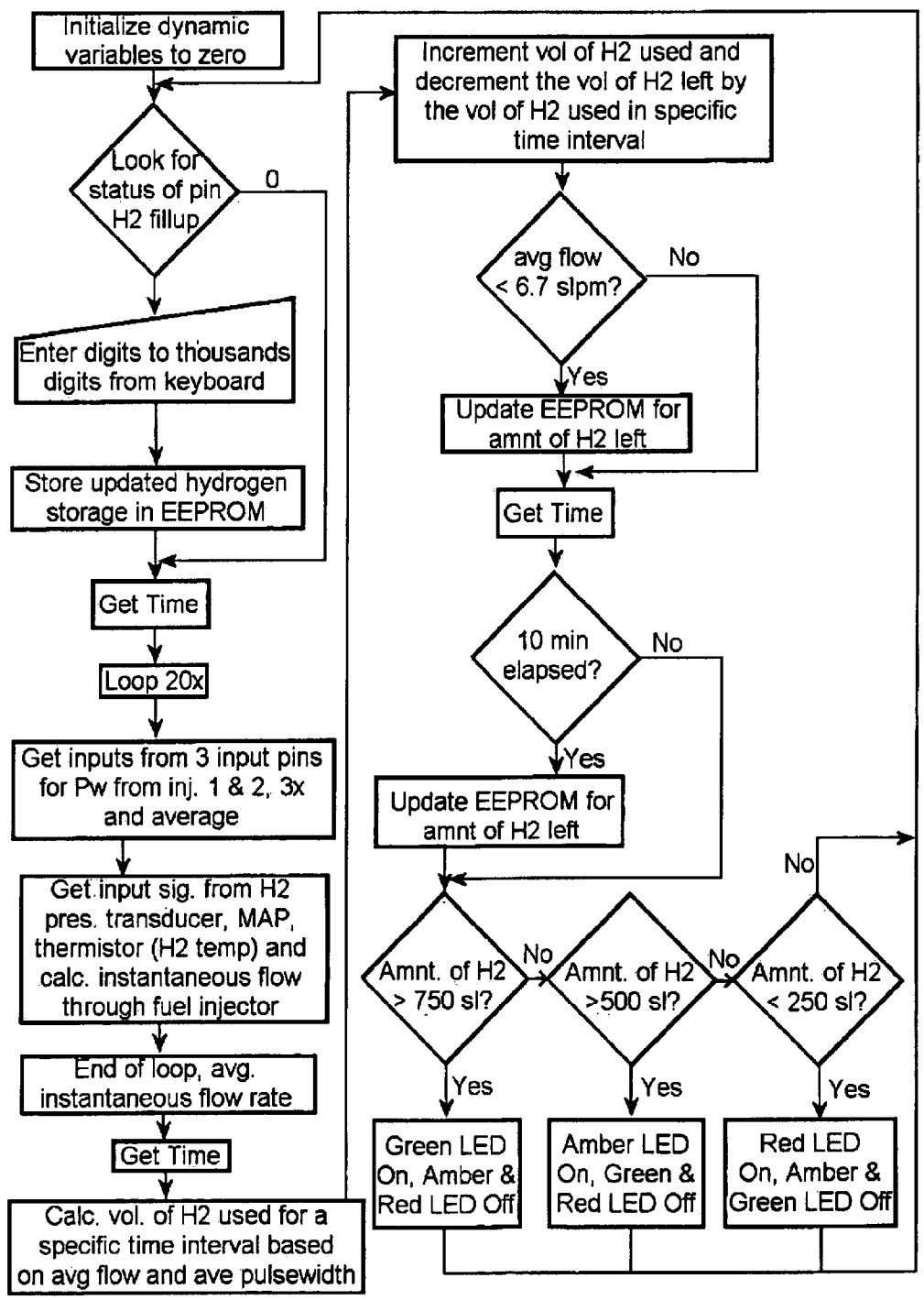
FIG. 7, shows a flow chart for the orifice plate based on-board fuel gauge in accordance with the present invention.

An orifice plate for an on-board fuel (hydrogen) flow measurement system may be used as an on-board fuel gauge for the hydrogen ICE scooter. A diagram of the on-board fuel measurement system 60 utilizing an orifice plate 61 is depicted in FIG. 6. A flow chart for the control unit in accordance with the present invention wherein an orifice plate for an on-board fuel (hydrogen) measurement system is used is depicted in FIG. 7. The orifice plate is positioned in the hydrogen stream 62 between the hydrogen fuel pressure regulator and the hydrogen fuel injector. Pressure of the hydrogen stream is measured after the hydrogen fuel pressure regulator but before the orifice plate 61 using a gas pressure sensor 63. The change in pressure across the orifice plate is measured by a differential pressure transducer 64 and the temperature of the hydrogen stream is also measured using a temperature sensor 65. These parameters are then input into a microcontroller 66 which calculates the instantaneous hydrogen flow rate. The volume of hydrogen that flows over a specific time interval is then calculated. This amount of hydrogen is then decremented from the known amount of hydrogen inside the hydrogen storage tank prior to discharge. The known amount of hydrogen present in the hydrogen storage unit is able to be calculated because each time the hydrogen storage tank is refilled, the amount of hydrogen input into the hydrogen storage tank is input into the microcontroller using a push button control 67. A value representing the volume of hydrogen input into the hydrogen storage unit is added to a value representing the volume of hydrogen left in the hydrogen storage unit and a value representing the revised volume is stored in the memory (EEPROM). During the next trip, a value representing the revised quantity of hydrogen stored in the hydrogen storage unit is used as a "starting value" from which the instantaneous consumption is decremented. Using the amount of hydrogen present in the hydrogen storage tank and the amount of hydrogen exiting the tank, the microcontroller is able to calculate the amount of hydrogen present in the hydrogen storage tank at any given time. The volume of hydrogen remaining in the hydrogen storage unit is then continuously updated and the amount remaining is communicated to the operator using visual indicators 68.

Figure 8:
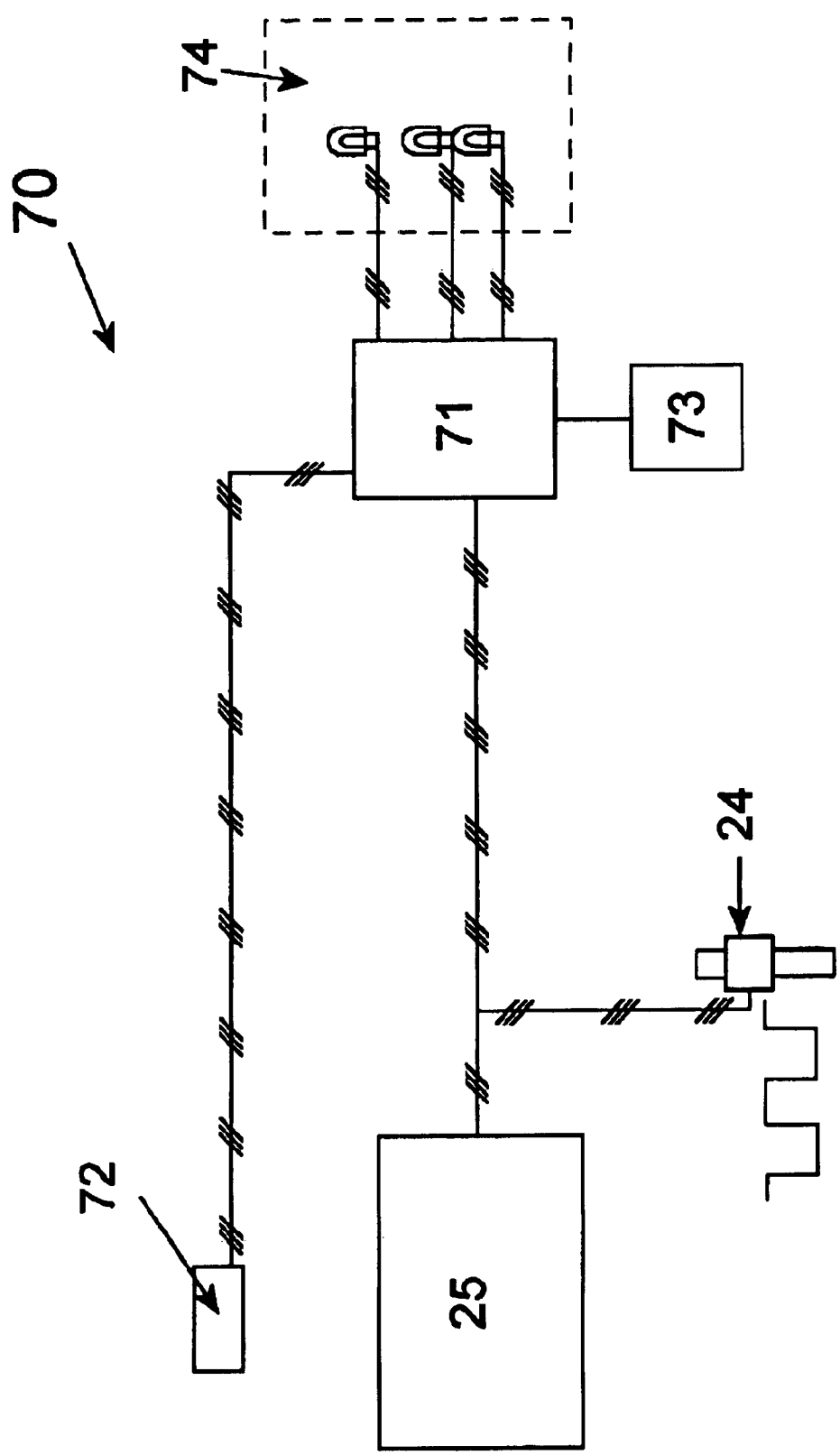
FIG. 8, shows a schematic representation of the fuel injector pulse width based on-board fuel gauge in accordance with the present invention.
Figure 9:
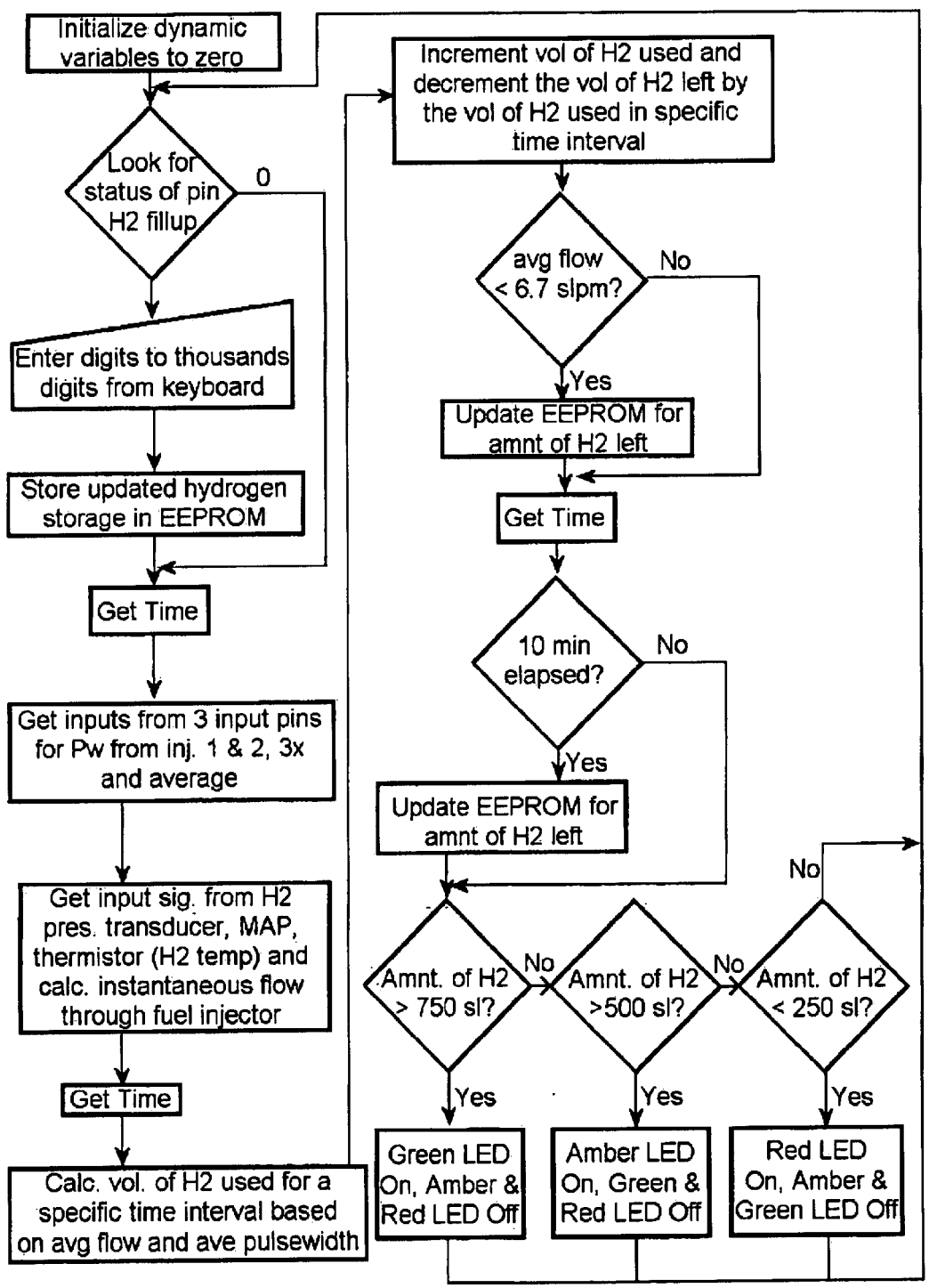
FIG. 9, shows a flow chart for the fuel injector pulse width based on-board fuel gauge in accordance with the present invention.

In another embodiment, the instantaneous hydrogen flow is calculated using a fuel injector pulse width based flow measurement system 70. An example of this system is shown in FIG. 8. A flow chart for the control unit in accordance with the present invention wherein a fuel injector pulse width based flow measurement system is used is shown in FIG. 9. Using this system, the pulse width of the hydrogen fuel injectors 24, as calculated by the hydrogen fuel control system 27 is directly input into the A/D input channel of the microcontroller 71. In addition, the microcontroller 71 uses the hydrogen pressure upstream and downstream (MAP) of the hydrogen fuel injector as measured by a MAP sensor 72. Knowing the equation of fuel flow through the hydrogen fuel injector 24, the volumetric hydrogen flow rate is calculated. Over a given interval, the volume of hydrogen that has been consumed is also calculated. This value is decremented from the volume of hydrogen stored on-board in the hydrogen storage unit as calculated using the updated volume as input into the microcontroller using a push button control 73 when the hydrogen storage unit is refilled. The volume of hydrogen remaining in the hydrogen storage unit is then continuously updated and the amount remaining is communicated to the operator using visual indicators 74.

The alloys used within the metal hydride hydrogen storage unit may be any of those known in art for such purposes. Specific alloys include $AB_2$ and $AB_5$ alloys, such as rare earth-nickel alloys, titanium-manganese alloys, titanium-zirconium alloys, titanium-iron alloys, magnesium alloys, and the like. Examples of such alloys can be found in U.S. Pat. Nos. 6,193,929; 6,103,024; 5,976,276; 5,916,381; 5,840,440; 4,832,913; 4,431,561 and in U.S. patent application Ser. Nos. 09/573,240; 09/609,487; 09/902,320; 09/901,816; 09/444,812; 09/873,863, all of which are herein incorporated by reference.

One example of a useful hydrogen storage alloy is a low temperature hydrogen storage alloy which is non-pyrophoric upon exposure to ambient atmosphere. The alloy particularly is non-pyrophoric even after hydrogen charge/discharge cycling. The alloy is an atomically engineered $TiMn_2$ type alloy. Preferred embodiments of the non-pyrophoric low temperature hydrogen storage alloy comprises titanium, zirconium, vanadium, chromium, and manganese. The alloy may further include iron and aluminum. Atomic engineering of the alloy includes adjusting the composition of the alloy to include increased chromium levels beyond that of conventional $TiMn_2$ alloys. That is, as the chromium content of the alloy increases, the tendency to be pyrophoric decreases. Particularly preferred alloy compositions comprise 0.5–10 at. % Zr, 29–35 at. % Ti, 10–15 at. % V, 13–20 at. % Cr, 32–38 at. % Mn, 1.5–3.0 at. % Fe, and 0.05–0.5 at. % Al. The alloy may further contain 1–10 at. % total of at least one element selected from the group consisting of Ba, Co, Cu, Cs, K, Li, Mm, Mo, Na, Nb, Ni, Rb, Ta, Tl, and W. Specific examples of useful alloys include the compositions $Zr_1 Ti_{33} V_{12.54} Cr_{15} Mn_{36} Fe_{2.25} Al_{0.21}$ and $Zr_{1.5} Ti_{32.5} V_{12.54} Cr_{15} Mn_{36} Fe_{2.25} Al_{0.21}$.

The effect of ignition timing, and lambda value (Air to fuel ratio) on the emissions ($NO_x$), engine horsepower and torque were studied on the hydrogen powered internal combustion engine. The torque and horsepower measurements were both performed on an engine dynamometer and chassis dynamometer. The engine temperature, exhaust temperature, metal hydride storage temperature, and hydrogen pressure were measured as well. The exhaust emissions, $NO_x$ and hydrogen, were also measured and correlated to the air to fuel ratio.

Using a chassis dynamometer test, one can determine the steady state performance (range, fuel consumption, horsepower and $NO_x$ emissions) of a typical drive cycle that includes acceleration, deceleration, and start and stop drive patterns.

Figure 10:
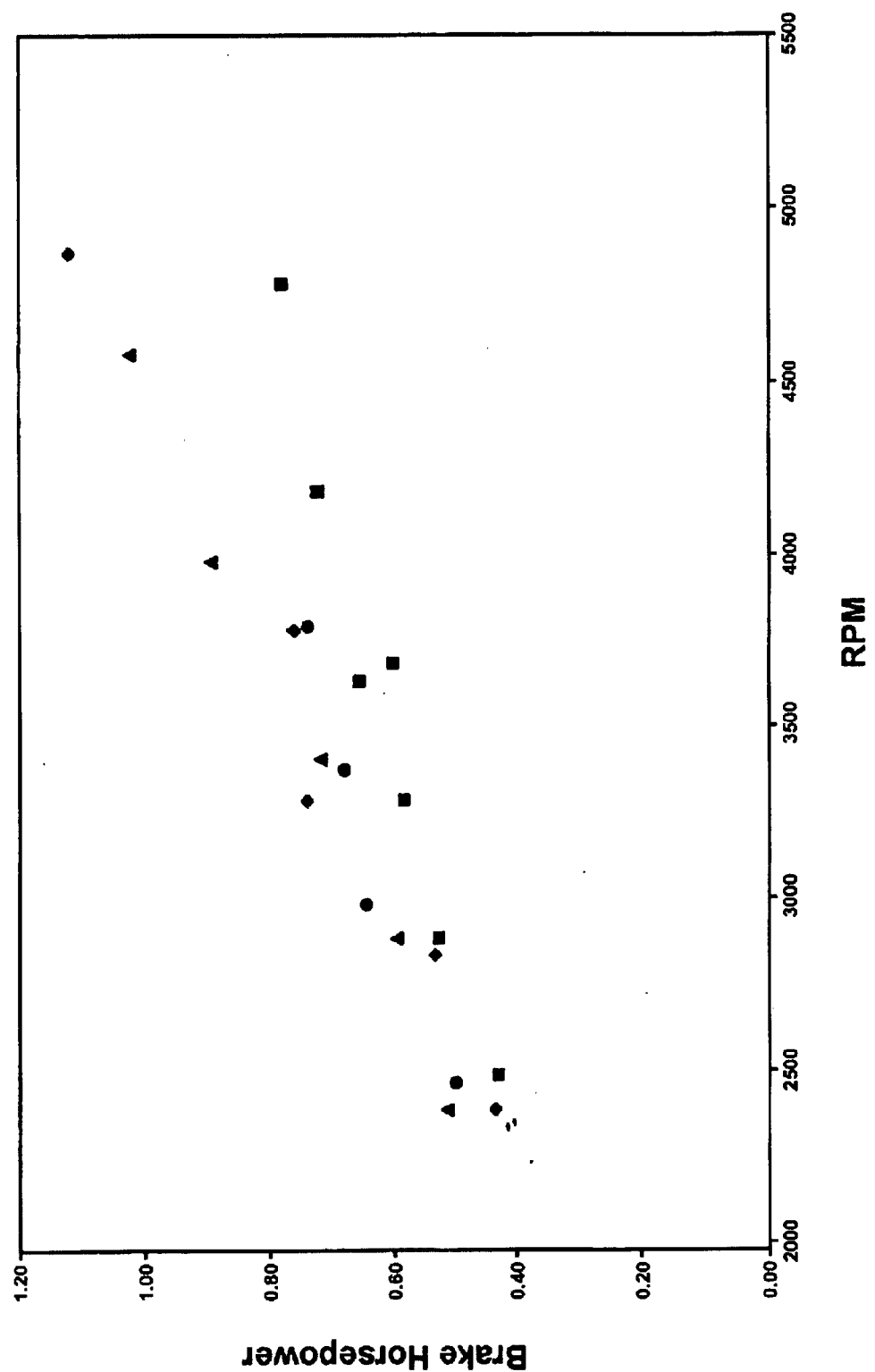
FIG. 10, shows the brake horsepower of the engine at wide open throttle versus RPM at a fixed λ value (actual air-fuel ratio divided by the stoichiometric air-fuel ratio) of 3.5 for the present invention.

FIG. 10 shows the brake horsepower of the hydrogen internal combustion engine at wide open throttle (WOT) versus RPM at a fixed air to fuel ratio of 3.5 for the present invention. The performance curves are shown for different ignition timing, namely 10 deg. before top dead center (BTDC) (●), 15 deg. BTDC (▲), 20 deg. BTDC (♦), and 25 deg. BTDC (■). Ultra High Pure Hydrogen was supplied from a compressed gas storage cylinder. Measurements were carried out with a water brake absorber at the crankshaft. The experimental results indicate some of the power lost (at 25 deg BTDC) can be recovered by retarding (15–20 deg BTDC) the ignition timing. This shows that the hydrogen is sensitive to spark advance as compared to gasoline.

Figure 11:
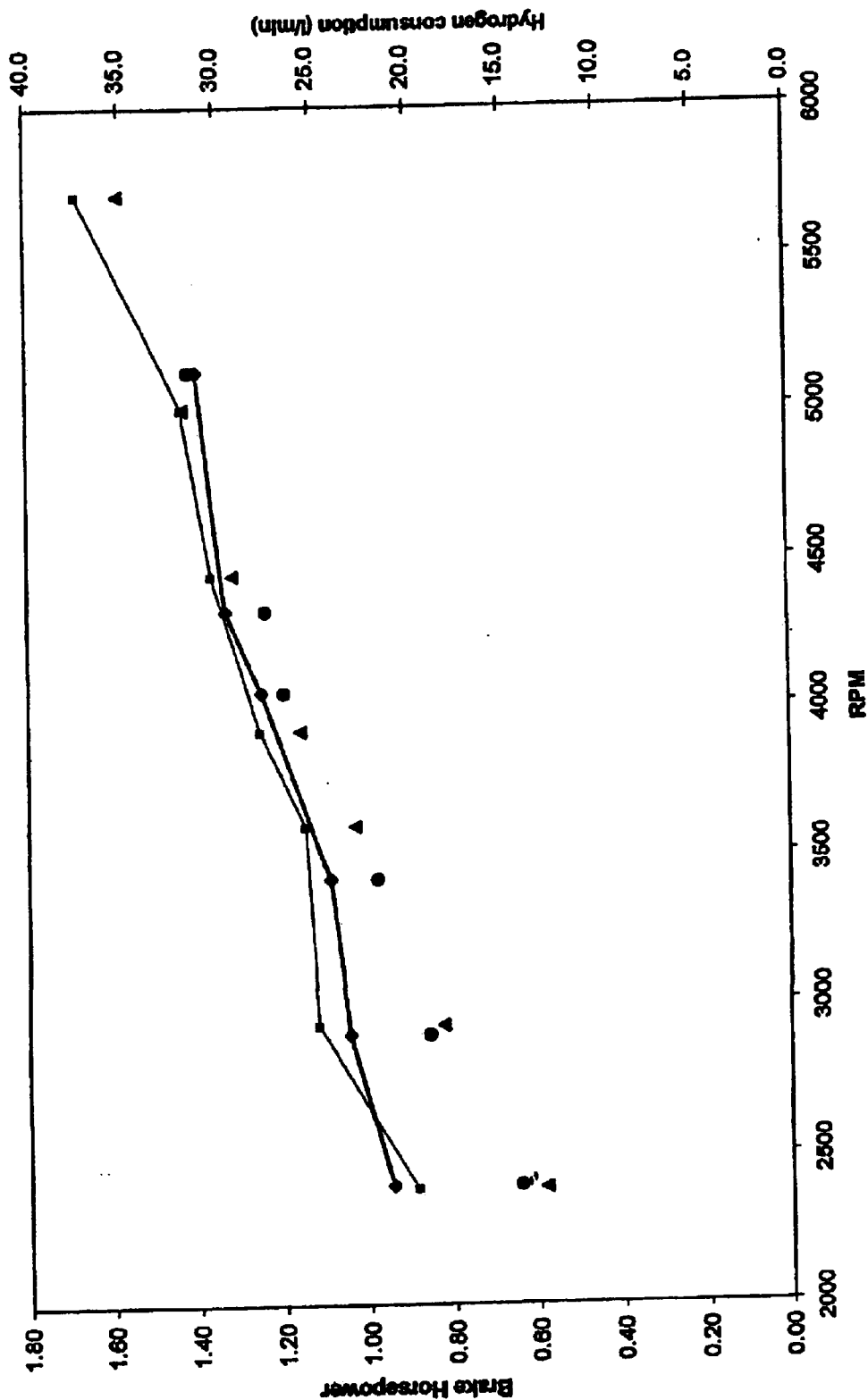
FIG. 11, shows the brake horsepower of the engine at wide open throttle versus RPM at a fixed λ value (actual air-fuel ratio divided by the stoichiometric air-fuel ratio) of 2.3 for the present invention.

FIG. 11 shows the brake horsepower of the hydrogen internal combustion engine at wide open throttle (WOT) versus RPM at a fixed air to fuel ratio of 2.3 for the present invention. The performance curves are shown for different ignition timings, namely 7 deg. BTDC (●) and 10 deg. BTDC (▲). Ultra High Pure Hydrogen was supplied from a compressed gas storage cylinder. Measurements were carried out with a water brake absorber at the crankshaft. The hydrogen consumption (in liters/min) is also shown at different ignition timings. The hydrogen consumption is shown at 7 deg. BTDC (♦) and at 10 deg. BTDC (■). The engine horsepower increases as the spark is retarded (7 deg BTDC versus 10 deg BTDC) at a given engine speed, but is not very pronounced. Due to fast burning characteristics of hydrogen as compared to gasoline, a retarded spark may be preferred.

Figure 12:
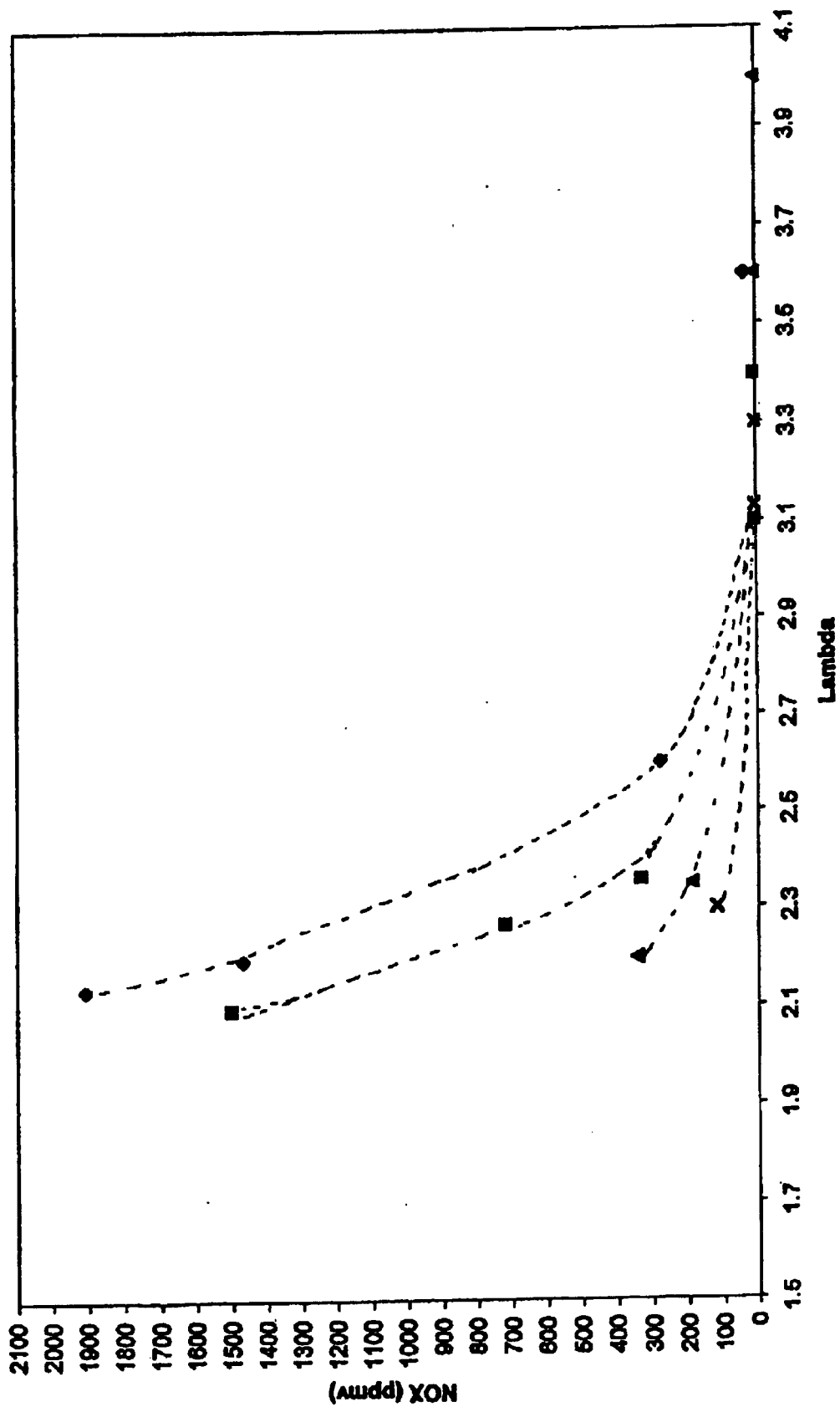
FIG. 12, shows $NO_x$ emissions of the hydrogen powered internal combustion engine of the present invention running on industrial grade hydrogen with respect to the λ value (actual air-fuel ratio divided by the stoichiometric air-fuel ratio) at wide open throttle on a chassis dynamometer.

FIG. 12 shows exhaust $NO_x$ versus lambda (actual air to fuel ratio versus stoichiometric air to fuel ratio) for the hydrogen powered internal combustion engine of the present invention. The wide open throttle (WOT) data was collected at 2500 RPM (♦), 3000 RPM(■), 4000 RPM (▲), and 4900 RPM (X) over a lambda range of 2.1 to 4.0. The ignition timing was fixed at 13 deg BTDC. Industrial grade hydrogen was supplied from a compressed gas storage cylinder.

Figure 13:
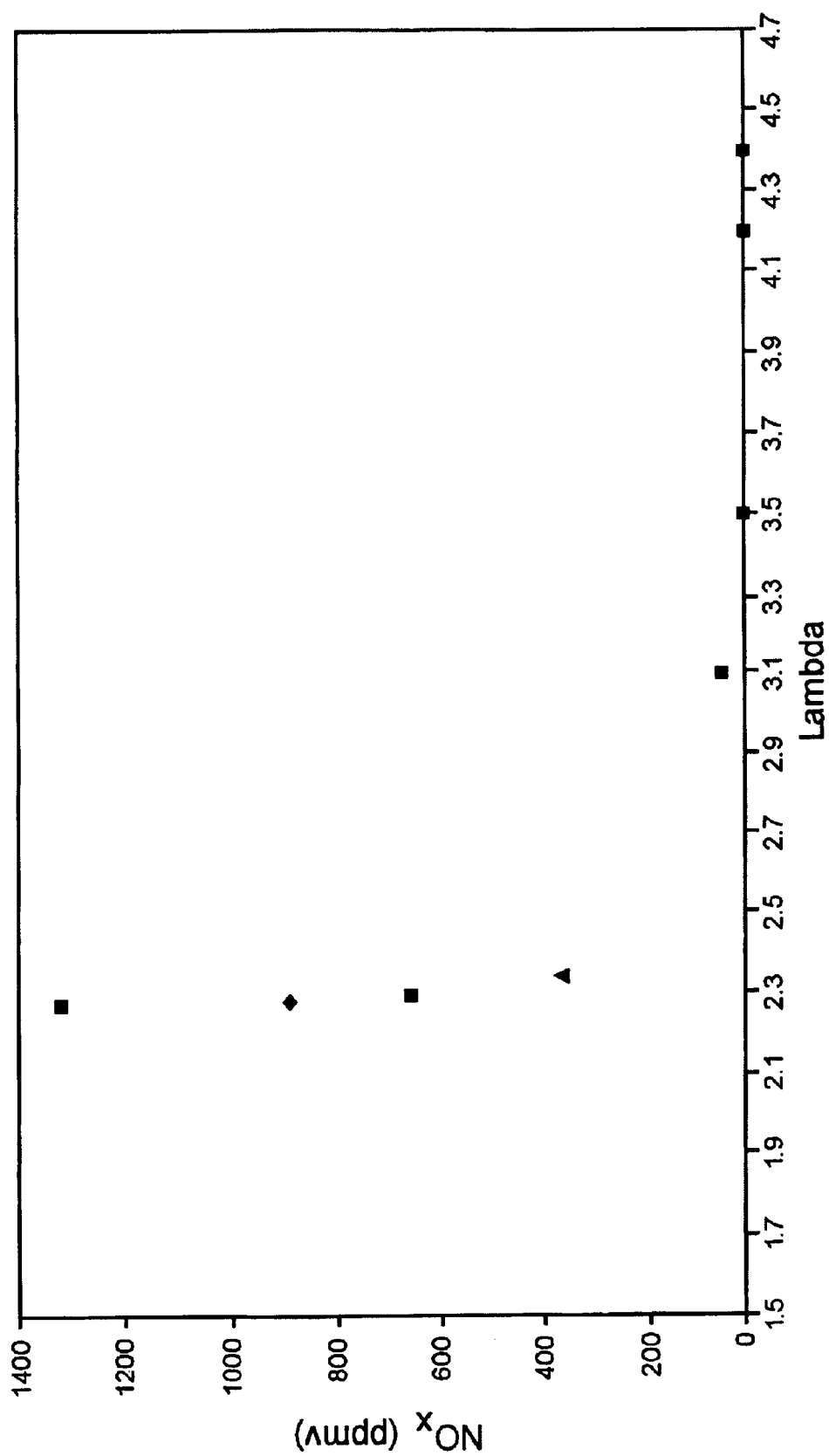
FIG. 13, shows $NO_x$ emissions of the hydrogen powered internal combustion engine of the present invention running on ultra high pure hydrogen with respect to the λ value (actual air-fuel ratio divided by the stoichiometric air-fuel ratio) at wide open throttle on a water brake dynamometer.

FIG. 13 shows exhaust $NO_x$ versus lambda (A/F versus stoichiometric A/F) for the hydrogen powered internal combustion engine of the present invention. The WOT data was collected at 2420 RPM (♦), 3000 RPM (■), and 3860 RPM (▲) over a lambda range of 2.3 to 4.3. The ignition timing was fixed at 10 deg BTDC. Ultra High Pure Hydrogen was supplied from a compressed gas storage cylinder.

Figure 14:
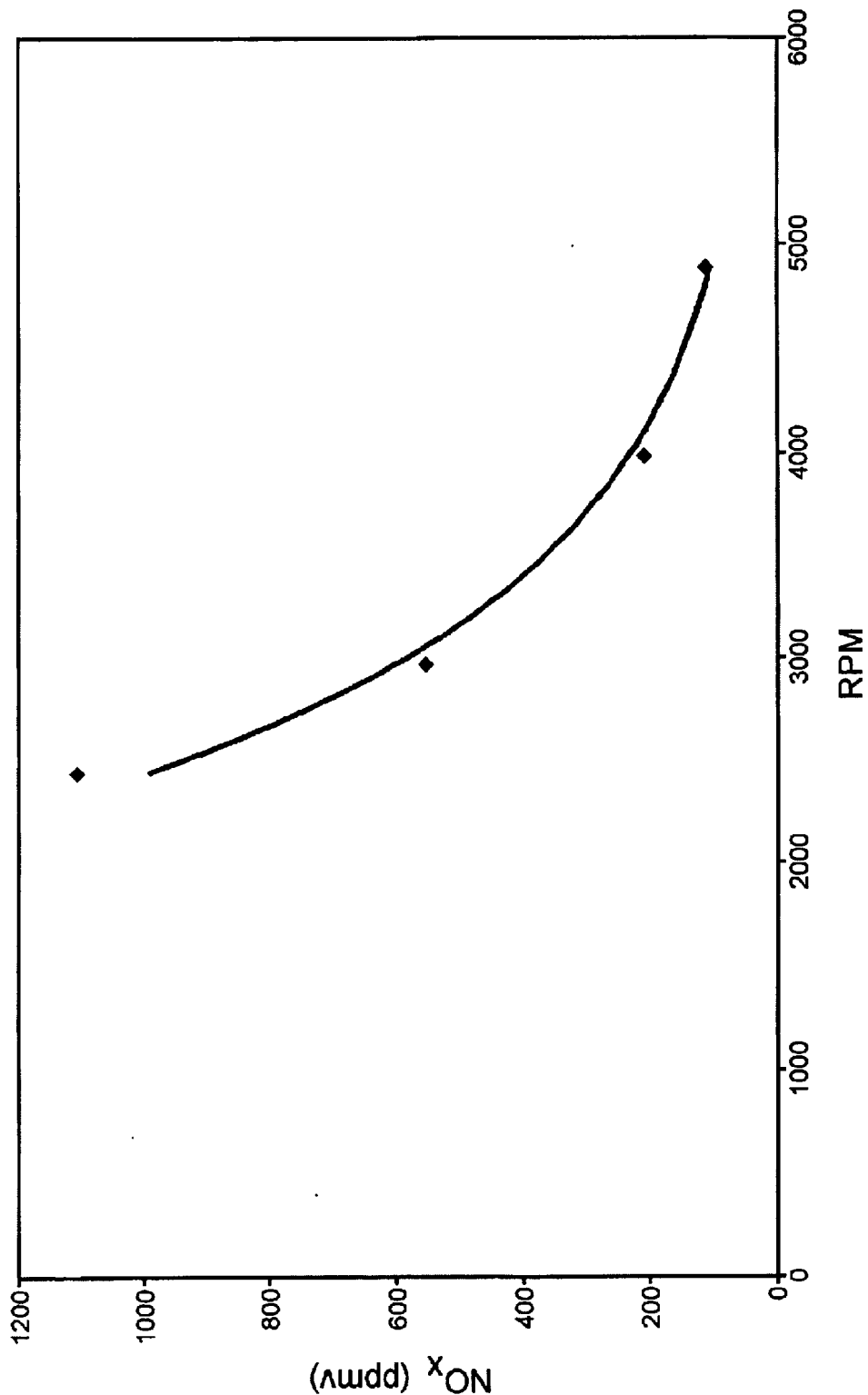
FIG. 14, shows the $NO_x$ emissions of the hydrogen powered internal combustion engine versus engine speed for the present invention.

FIG. 14 shows the Exhaust $NO_x$ versus engine speed for the hydrogen internal combustion engine of the present invention. The ignition timing is fixed at 13 deg BTDC and lambda is fixed at 2.3. Industrial grade hydrogen was supplied from a compressed gas storage cylinder. As engine speed decreases for a fixed lambda, the NOX in the exhaust increases.

Herein described is a steady state road test carried out on the hydrogen ICE scooter in accordance with the present invention. Hydrogen was supplied from a metal hydride storage system in accordance with the present invention charged with 140 grams of hydrogen. The tests were carried out at an outside temperature of 92° F.

The hydrogen ICE scooter air to fuel ratio (lambda) of 3.3–3.5 was maintained through out the run. The average hydrogen consumption was 3.8 grams hydrogen/km. The average speed during the road test was 32 kilometers/hour with a top speed of 40 kilometers/hour. The hydrogen ICE scooter obtained a range of 35 miles using 140 grams of hydrogen.

The foregoing is provided for purposes of explaining and disclosing preferred embodiments of the present invention. Modifications and adaptations to the described embodiments, particularly involving changes to the fuel induction system, the hydrogen storage unit, operating conditions of the hydrogen powered internal combustion engine, and the control system will be apparent to those skilled in the art. These changes and others may be made without departing from the scope or spirit of the invention in the following claims.

What is claimed is:

1. A hydrogen powered scooter comprising:
  a hydrogen powered internal combustion engine operatively connected to said hydrogen powered scooter, whereby said hydrogen powered internal combustion engine propels said hydrogen powered scooter;
  a fuel induction system for controlling the amount of hydrogen supplied to said hydrogen powered internal combustion engine;
  an ignition system for combusting the hydrogen inside said hydrogen powered internal combustion engine; and
  an on-board hydrogen storage unit in gaseous communication with said hydrogen powered internal combustion engine, said on-board hydrogen storage unit including an on-board hydrogen fuel gauge for measuring and displaying the amount of hydrogen stored in said on-board hydrogen storage unit, said on-board hydrogen fuel gauge comprising an on-board microcontroller, a visual indicator showing the amount of hydrogen present in said on-board hydrogen storage unit, and a hydrogen gas flow metering system for tracking the amount of hydrogen input into said hydrogen storage unit.

2. The scooter according to claim 1, wherein said hydrogen powered internal combustion engine comprises at least one cylinder supplied with a throttled air stream.

3. The hydrogen powered scooter according to claim 2, wherein said fuel induction system comprises a hydrogen fuel control system, at least one hydrogen fuel injector, and a hydrogen fuel pressure regulator.

4. The hydrogen powered scooter according to claim 3, wherein said hydrogen fuel control system is configured to provide a hydrogen fuel control signal having a hydrogen fuel injector pulse width to said hydrogen fuel injector.

5. The hydrogen powered scooter according to claim 4, therein said hydrogen fuel control signal is based upon engine speed, manifold absolute pressure, and throttle position.

6. The hydrogen powered scooter according to claim 4, wherein said hydrogen fuel control signal is based upon engine speed, manifold absolute pressure, throttle position, temperature of said throttled stream of air, and amount of oxygen present in exhaust from said hydrogen powered internal combustion engine.

7. The hydrogen powered scooter according to claim 4, wherein said hydrogen fuel control signal controls the amount of hydrogen injected by said hydrogen fuel injector into said throttled air stream.

8. The hydrogen powered scooter according to claim 7, wherein said hydrogen fuel injector comprises a feed tube positioned within said throttled air stream.

9. The hydrogen powered scooter according to claim 7, wherein said hydrogen fuel injector comprises a boost venturi positioned within said throttled air stream.

10. The hydrogen powered scooter according to claim 7, wherein said throttled air stream has a λ value between 1 and 10.

11. The hydrogen powered scooter according to claim 10, wherein said throttled air stream has a λ value between 2 and 5.

12. The hydrogen powered scooter according to claim 11, wherein said throttled air stream has a λ value between 3 and 4.

13. The hydrogen powered scooter according to claim 3, wherein said hydrogen fuel pressure regulator controls the pressure of the hydrogen gas at said hydrogen fuel injector.

14. The hydrogen powered scooter according to claim 1, wherein said ignition system comprises a multiple spark discharge ignition controller, a spark plug, and a spark trigger.

15. The hydrogen powered scooter according to claim 14, wherein said multiple spark discharge ignition controller is triggered off of a camshaft.

16. The hydrogen powered scooter according to claim 15, wherein said camshaft utilizes a sensor allowing said spark plug to fire only on a compression stroke.

17. The hydrogen powered scooter according to claim 15, wherein said ignition system further comprises a programmable ignition control system.

18. The hydrogen powered scooter according to claim 17, wherein said programmable ignition control system causes said spark plug to fire at a specific crank angle at a given speed.

19. The hydrogen powered scooter according to claim 1, wherein said on-board hydrogen storage unit comprises at least one metal hydride storage unit at least partially filled with a hydrogen storage alloy.

20. The hydrogen powered scooter according to claim 19, wherein said metal hydride storage unit is in thermal contact with a heat source.

21. The hydrogen powered scooter according to claim 20, wherein said heat source is an exhaust stream from said hydrogen powered internal combustion engine.

22. The hydrogen powered scooter according to claim 20, wherein said heat source is an engine cooling stream.

23. The hydrogen powered scooter according to claim 19, wherein at least one gas filtration/distribution tube is longitudinally disposed in said metal hydride storage unit.

24. The hydrogen powered scooter according to claim 23, wherein hydrogen enters and exits said metal hydride storage unit via said gas filtration/distribution tube.

25. The hydrogen powered scooter according to claim 24, wherein said gas filtratoin/distribution tube is wrapped with a stainless steel wire cloth.

26. The hydrogen powered scooter according to claim 19, wherein said metal hydride storage unit is laterally divided into a plurality of compartments with at least one heat conductive segmental plate.

27. The hydrogen powered scooter according to claim 19, wherein a metal wool pad in positioned at the top and bottom of said metal hydride storage unit.

28. The hydrogen powered scooter according to claim 19, wherein paid metal hydride storage units are thermally connected via a plurality of heat conductive fins each having a plurality of L-ledged holes.

29. The hydrogen powered scooter according to claim 28, wherein said metal hydride storage units are inserted through said L-ledged poles.

30. The hydrogen powered scooter according to claim 1, wherein said on-board hydrogen fuel gauge further comprises an orifice plate fuel measurement system.

31. The hydrogen powered scooter according to claim 30, wherein said orifice plate fuel measurement system comprises an orifice plate positioned between said hydrogen fuel pressure regulator and said hydrogen fuel injector and a plurality of sensors.

32. The hydrogen powered scooter according to claim 31, wherein said plurality of sensors measure a group of parameters comprising:

(A) hydrogen gas pressure before said orifice plate, (B) hydrogen gas pressure drop across said orifice plate, and (C) temperature of said hydrogen gas at said orifice plate.

33. The hydrogen powered scooter according to claim 32, wherein said on-board microcontroller calculates an instantaneous flow rate of hydrogen gas using said group of parameters.

34. The hydrogen powered scooter according to claim 33, wherein said instantaneous flow rate of hydrogen gas is decremented from a known amount of hydrogen contained inside said hydrogen storage unit prior to discharge to calculate a value indicative of the actual amount of hydrogen present in said hydrogen storage unit.

35. The hydrogen powered scooter according to claim 34, wherein said known amount of hydrogen contained inside said hydrogen storage unit is calculated using a value input into said microcontroller representing an amount of hydrogen input into said hydrogen storage unit upon refueling.

36. The hydrogen powered scooter according to claim 1, wherein said hydrogen gas flow metering system further comprises a fuel injector pulse width flow measurement system for calculating a fuel injector pulse width.

37. The hydrogen powered scooter according to claim 36, wherein said hydrogen fuel injector pulse width is directly input into an A/D input channel of said microcontroller.

38. The hydrogen powered scooter according to claim 37, wherein said microcontroller calculates a volumetric flow rate of hydrogen consumed over time based on said hydrogen fuel injector pulse width and manifold absolute pressure.

39. The hydrogen powered scooter according to claim 38, wherein said volumetric flow rate of hydrogen consumed over time is decremented from a known amount of hydrogen contained inside said hydrogen storage unit prior to discharge to calculate a value indicative of the actual amount of hydrogen present in said hydrogen storage unit.

40. The hydrogen powered scooter according to claim 39, wherein said known amount of hydrogen contained inside said hydrogen storage unit is calculated using a value input into said microcontroller representing an amount of hydrogen input into said hydrogen storage unit upon refueling.

* * * * *

UNITED STATES PATENT AND TRADEMARK OFFICE
CERTIFICATE OF CORRECTION

| | | |
|---|---|---|
| PATENT NO. | : 6,918,382 B2 | Page 1 of 1 |
| APPLICATION NO. | : 10/227764 | |
| DATED | : July 19, 2005 | |
| INVENTOR(S) | : Submaranian Ramachandran et al. | |

It is certified that error appears in the above-identified patent and that said Letters Patent is hereby corrected as shown below:

Please insert statement below before 1st paragraph of patent:

--This invention was made with U.S. Government support under Contract No. DE-FG36-97GO10212 awarded by the U.S. Department of Energy. The Government has certain rights in this invention--

Signed and Sealed this

Twenty-seventh Day of November, 2007

JON W. DUDAS
*Director of the United States Patent and Trademark Office*